(12) United States Patent
Chozui

(10) Patent No.: US 7,784,074 B2
(45) Date of Patent: Aug. 24, 2010

(54) DIGITAL BROADCAST RECEIVING TERMINAL

(75) Inventor: Sadatoshi Chozui, Osaka (JP)

(73) Assignee: Panasonic Corporation, Osaka (JP)

( * ) Notice: Subject to any disclaimer, the term of this patent is extended or adjusted under 35 U.S.C. 154(b) by 416 days.

(21) Appl. No.: 11/574,835

(22) PCT Filed: Sep. 16, 2005

(86) PCT No.: PCT/JP2005/017537

§ 371 (c)(1),
(2), (4) Date: Mar. 7, 2007

(87) PCT Pub. No.: WO2006/030974

PCT Pub. Date: Mar. 23, 2006

(65) Prior Publication Data

US 2008/0016542 A1    Jan. 17, 2008

(30) Foreign Application Priority Data

Sep. 16, 2004    (JP) ............................... 2004-269594

(51) Int. Cl.
*G06F 3/00*       (2006.01)
*G06F 13/00*      (2006.01)
*H04N 5/445*      (2006.01)
*H04N 5/50*       (2006.01)
*H04N 7/173*      (2006.01)
*H04W 4/00*       (2009.01)

(52) U.S. Cl. .............................. 725/50; 725/39; 725/46; 725/105; 370/331; 348/569; 348/570; 348/731; 348/732

(58) Field of Classification Search ................... 725/35, 725/36, 46, 62, 83, 85, 86, 89, 100, 110, 725/131, 135, 139, 151; 370/331; 348/569, 348/570, 731, 732
See application file for complete search history.

(56) References Cited

U.S. PATENT DOCUMENTS 6,181,921 B1 *    1/2001    Konisi et al. ............. 455/186.2

(Continued)

FOREIGN PATENT DOCUMENTS

JP    3-110979 A    5/1991

(Continued)

OTHER PUBLICATIONS

International Search Report for Pct/JP2005/017537, dated Dec. 27, 2005.

*Primary Examiner*—Dominic D Saltarelli
(74) *Attorney, Agent, or Firm*—RatnerPrestia

(57) ABSTRACT

When a station whose information has been kept stored in memory is again receivable a digital broadcasting receiver terminal can select the station immediately based on station selection information, without making a channel scanning in search for the station again. Further, it can be made available for immediate use without the need of re-acquiring the program information. The digital broadcasting receiver terminal includes a digital broadcasting receiving section for receiving digital broadcasting, a station information memory for storing station information restored at the digital broadcasting receiving section, a station information keep/erase judgment section for deciding as to whether information stored in the station information memory is to be kept stored or erased, and a control section which selects a station based on information stored in the station information memory.

19 Claims, 14 Drawing Sheets

U.S. PATENT DOCUMENTS

| | | | |
|---|---|---|---|
| 6,340,997 B1 * | 1/2002 | Borseth | 348/731 |
| 6,873,629 B2 * | 3/2005 | Morris | 725/139 |
| 7,073,189 B2 * | 7/2006 | McElhatten et al. | 725/58 |
| 7,146,627 B1 * | 12/2006 | Ismail et al. | 725/36 |
| 7,451,151 B2 * | 11/2008 | Horvitz et al. | 725/47 |
| 2002/0112240 A1 * | 8/2002 | Bacso et al. | 725/47 |
| 2002/0166128 A1 * | 11/2002 | Ikeda et al. | 725/112 |
| 2002/0174430 A1 * | 11/2002 | Ellis et al. | 725/46 |
| 2006/0033843 A1 * | 2/2006 | Klopfenstein et al. | 348/570 |
| 2009/0044226 A1 * | 2/2009 | Ellis et al. | 725/46 |

FOREIGN PATENT DOCUMENTS

| | | |
|---|---|---|
| JP | 6-292097 A | 10/1994 |
| JP | 2001-169195 A | 6/2001 |
| JP | 2001-237729 A | 8/2001 |
| JP | 2001-244832 A | 9/2001 |
| JP | 2001-285101 A | 10/2001 |
| JP | 2002-359825 A | 12/2002 |
| JP | 2003-152578 A | 5/2003 |

* cited by examiner

DIGITAL BROADCAST RECEIVING TERMINAL

This application is a U.S. National Phase Application of PCT International Application PCT/JP2005/017537.

TECHNICAL FIELD

The present invention relates to a digital broadcasting receiver terminal.

BACKGROUND ART

Generally speaking, a digital broadcasting receiver terminal can acquire information about a presently-receivable broadcasting station from digital broadcasting signal, and store the acquired information within the terminal. Digital broadcasting receiver terminals as disclosed in Japanese Patent Unexamined Publications No. 2003-152578 and No. 2001-285101, for example, are provided beforehand with information about all the stations and store them. These digital broadcasting receiver terminals disclosed in the above two Publications are used for describing a conventional receiver terminal, which is made with reference to FIG. 14 and FIG. 15.

The terminology, information about broadcasting station, used here includes, for example, information for station selection (physical channel, ID for specifying a station, area code, etc.), service information (structure of services, name of the services, logo data, etc.), program information (program name, video/audio indication, etc.).

Digital receiver terminal 100 shown in FIG. 14 can acquire information about receivable station from the digital broadcasting signal, and store it within itself. The structure of a conventional digital broadcasting receiver terminal disclosed in Japanese Patent Unexamined Publication No. 2003-152578 is used to describe digital broadcasting receiver terminal 100. In FIG. 14, digital receiver terminal 100 includes digital broadcasting receiving section 101, control section 102, video display section 104, audio output section 105, input section 106 and station information memory 107.

Digital broadcasting receiver terminal 100 carries out a channel scanning for investigating a station which can be received at the present moment. Digital broadcasting signal about a station then received is delivered to digital broadcasting receiving section 101. Digital broadcasting receiving section 101 demodulates the digital broadcasting signal received from the station, corrects error, and transport-decodes it. Information about the station is extracted from the transport-decoded information, and delivered via control section 102 to station information memory 107 to be stored in there. After the channel scanning is finished, control section 102 reads out a station selection information from among the information about station stored in station information memory 107, and controls digital broadcasting receiving section 101. Digital broadcasting receiving section 101 under the control of control section 102 selects a desired station. It demodulates, error-corrects and transport-decodes the selected station, and makes decoding with video and audio. The decoded video signal is displayed on video display section 104, while the decoded audio signal is outputted through audio output section 105; thus the broadcasting is made available to an audience. Control section 102 reads out service information and program information from among the information about station, in order to have them compiled at digital broadcasting receiving section 101 into a program table for display on video output section 104.

When digital broadcasting receiver terminal 100 moved to other place and it turned out impossible to receive broadcasting of a station, it makes a channel scanning once again. If it can not receive the station despite the channel scanning, control section 102 erases information about the station from station information memory 107.

As described in the above, conventional digital broadcasting receiver terminal erases information about a station when it turned out impossible to receive. Therefore, when the same station becomes available again, it has to make a channel scanning once again for acquiring the information about station anew.

FIG. 15 shows the structure of a conventional digital broadcasting receiver terminal as disclosed in Japanese Patent Unexamined Publication No. 2001-285101, which stores the information about all the stations provided beforehand. FIG. 15 is basically identical with FIG. 14, except that FIG. 15 is provided further with location information receiving section 108.

Digital broadcasting receiver terminal 100 selects, on the basis of location information received at location information receiving section 108 and information stored in station information memory 107, only an information about station which is receivable at the present location. Digital broadcasting receiving section 101 under the control of control section 102 selects a station. It demodulates, error-corrects and transport-decodes the station, and makes decoding with video and audio. The decoded video signal is displayed on video display section 104, while the decoded audio signal is outputted through audio output section 105; the broadcasting is thus made available to an audience. In some cases, a location information inputted by an audience via input section 106 is used, in place of that provided by location information receiving section 108.

Among the information about station, the service information can be changed by a station at its free option any time, the program information changes in its nature from time to time every day. Therefore, these types of information can not be stored in memory beforehand. When digital broadcasting receiver terminal 100 moved to other place and it turned out impossible to receive a station, control section 102 erases service information and program information of the station from those stored in station information memory 107.

As described in the above, a conventional digital broadcasting receiver terminal as shown in FIG. 15 erases such types of station information that do not fit for preserving, when receiving of the station turned out to be impossible. Consequently, when the same station becomes receivable again, it is compelled to acquire information about the station once again.

DISCLOSURE OF THE INVENTION

A digital broadcasting receiver terminal which includes
 a digital broadcasting receiving section for receiving digital broadcasting,
 a station information memory for storing station selection information restored at digital broadcasting receiving section,
 a station information keep/erase Judgment section for deciding as to whether an information stored in station information memory is to be kept stored or erased, and
 a control section for selecting a station based on station selection information stored in the station information memory.

A digital broadcasting receiver terminal which includes
a digital broadcasting receiving section for receiving digital broadcasting,
a station information memory for storing at least either one of service information restored at the digital broadcasting receiving section and program information,
a station information keep/erase judgment section for deciding as to whether an information stored in station information memory is to be kept stored or erased, and
a control section for controlling the displaying of information stored in the station information memory.

A digital broadcasting receiver terminal which includes
a digital broadcasting receiving section for receiving digital broadcasting,
a station information memory for storing station selection information restored at the digital broadcasting receiving section and program information,
a station information keep/erase judgment section for deciding as to whether an information stored in station information memory is to be kept stored or erased, and
a control section for selecting a station based on station selection information stored in the station information memory; in which, when it turns out to be impossible to receive a station,
the station information storage/erase judgment section decides to keep an information, among those information stored, stored as it is if the program information bears a future factor; on the other hand, if the entire program information is of the past nature, the information is judged to be unnecessary and erased.

DETAILED DESCRIPTION OF PREFERRED EMBODIMENTS

The above-described conventional digital broadcasting receiver terminals erase a station information when it turns out impossible to receive the station. As the result, the station information has to be acquired anew when the station becomes receivable again. This has been an outstanding problem left unsolved.

In order to solve the problem, the receiver terminal in the present invention keeps on holding, not erasing, a station information even if it turned out impossible to receive the station, when it is recognized to be necessary by the receiver terminal in accordance with such criteria as: The station is locating close to his, or her, domicile; An audience is opting for keep on storing the information; The time when it turned out to be impossible to receive the station is relatively recent; A future program information has already been acquired; The station should be receivable from the present location; The station is locating in an area contiguous to the present place; The station is locating in an area which has been registered as destination in a navigation terminal, which is connected to or built-in; The station is receivable on a registered route.

Thus, if a station whose information has been kept stored turns out to be receivable once again, a digital broadcasting receiver terminal in the present invention can immediately select the station based on station selection information, without the need of again making a channel scanning in search for the station. Furthermore, it can be used immediately without re-acquiring the program information.

First Exemplary Embodiment

Figure 1:
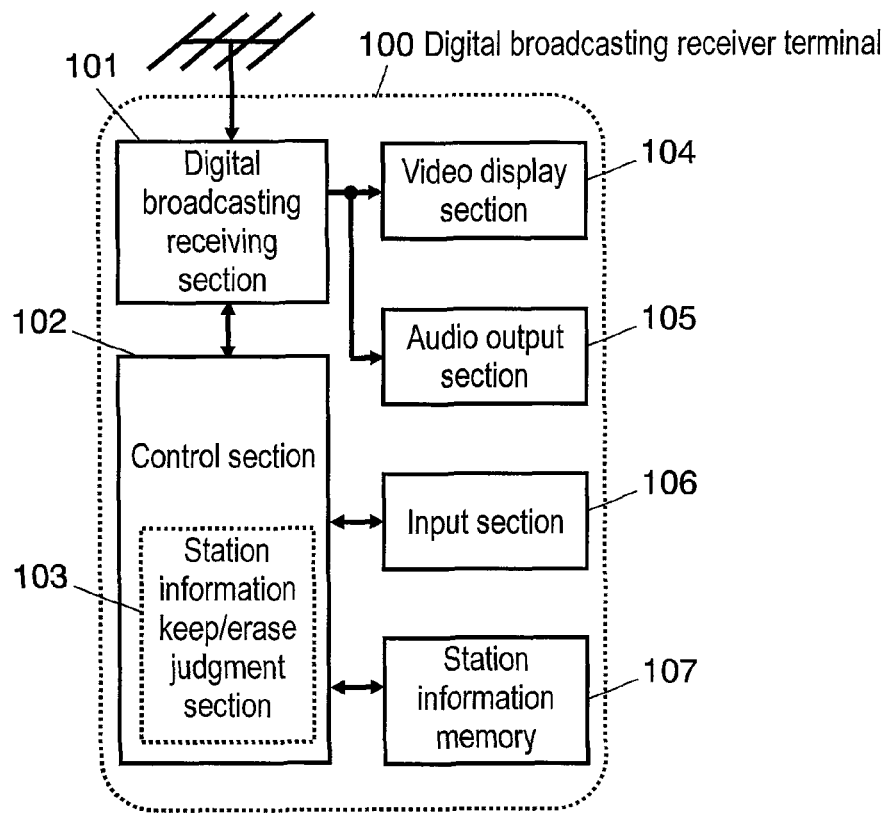
FIG. 1 is a block diagram showing the structure of digital broadcasting receiver terminals in the first through fourth embodiments of the present invention.

FIG. 1 is a block diagram which shows a digital broadcasting receiver terminal in accordance with a first embodiment of the present invention. Referring to FIG. 1, digital broadcasting receiver terminal 100 includes digital broadcasting receiving section 101, control section 102, station information keep/erase judgment section 103, video display section 104, audio output section 105, input section 106 and station information memory 107.

Figure 2:
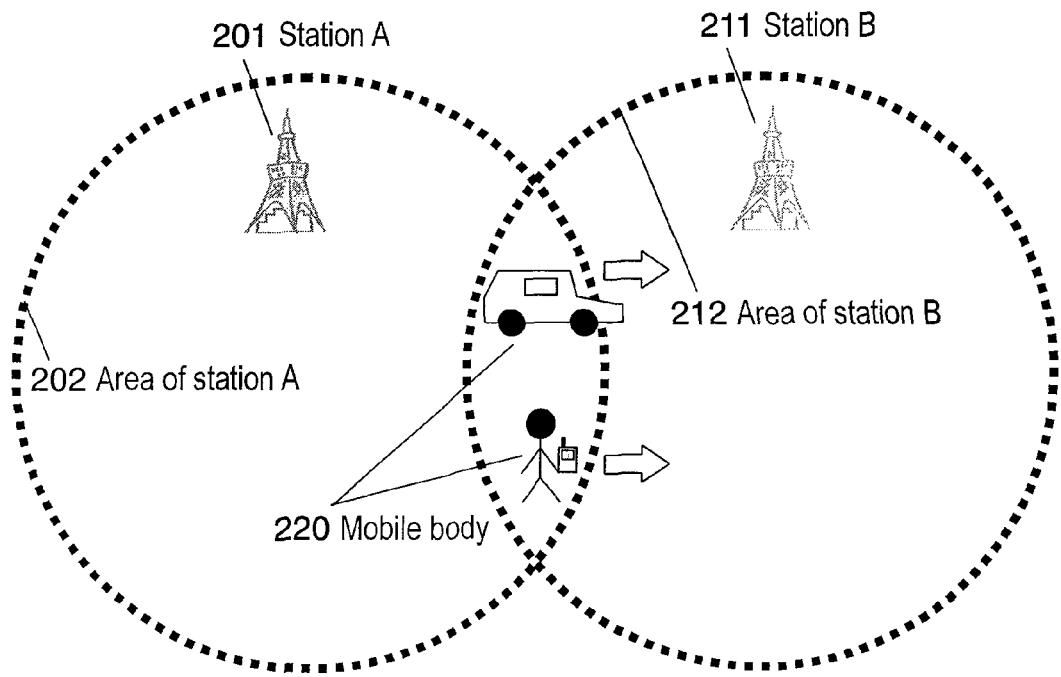
FIG. 2 shows the image how a moving terminal receives digital broadcasting, in the first through eighth embodiments.

FIG. 2 illustrates an image of reception by a moving digital broadcasting receiver terminal, in the first embodiment of the present invention. Referring to FIG. 2, area 202 is an area where it can receive the broadcasting of station A201; area 212 is an area where it can receive the broadcasting of station B211. Mobile body 220 moves in and between these areas.

Station A201 and station B211 are affiliated stations, each having its own area of broadcasting. They broadcast the same program in a certain time zone simultaneously, while each of them broadcasts different program of its own in other time zone.

Figure 3:
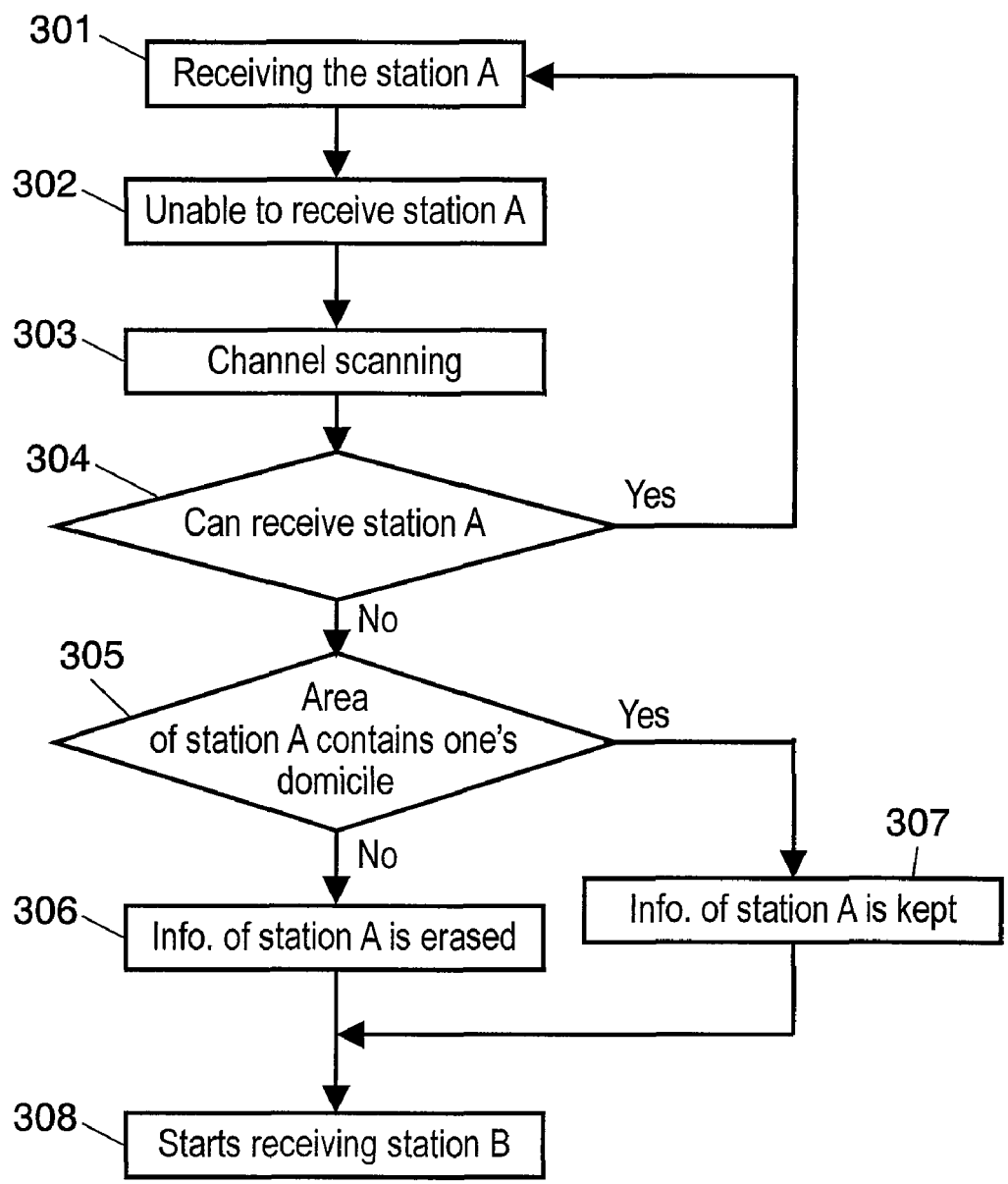
FIG. 3 is a flow chart describing a process how it decides as to whether to keep on storing a station information or to erase it, in the first embodiment.

FIG. 3 is a flow chart which shows the process how a digital broadcasting receiver terminal in the first embodiment judges as to whether information about a station now became unavailable for receiving is to be kept stored or erased.

Figure 4:
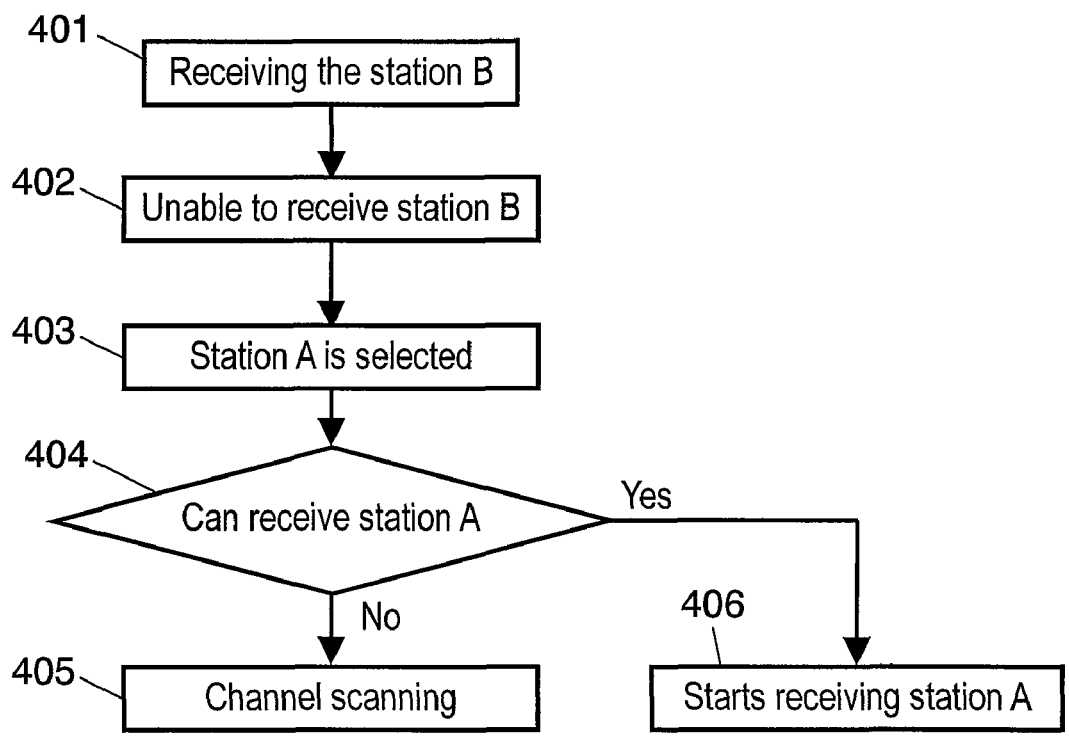
FIG. 4 is a flow chart showing a case when a receiver terminal whose information has been kept stored moves to other station area, in the first through eighth embodiments.

FIG. 4 is a flow chart showing the process when a digital broadcasting receiver terminal in the first embodiment returned to an area of a station whose information has been kept stored.

Digital broadcasting receiver terminal 100 makes a channel scanning in search for a station presently receivable. Digital broadcasting receiving section 101 receives digital broadcasting signal from a station then receivable. It demodulates and error-corrects it, and makes transport-decoding. Digital broadcasting receiving section 101 picks up information about the station, which information is delivered via control section 102 to station information memory 107, and stored in there.

The information about station contains, for example, information for station selection (physical channel, ID for specifying a station, area code, etc.), service information (structure of services, name of the services, logo data, etc.), program information (program name, video/audio indication, etc.).

After the channel scanning is finished, control section 102 reads out station selection information from the station information stored in station information memory 107, and controls digital broadcasting receiving section 101. Digital broadcasting receiving section 101 under the control of control section 102 selects a desired station, demodulates and error-corrects it, and makes transport-decoding, and then decodes the video and audio. The decoded video signal is displayed on video display section 104, while the decoded audio signal is outputted through audio output section 105; the broadcasting is thus made available to an audience. Further, control section 102 reads out service information and program information from the station information. Digital broadcasting receiving section 101 provides a program table based on these read-out information. It can be displayed on video display section 104.

Suppose a receiver terminal is receiving the broadcasting of station A 201. Step 301 in FIG. 3 indicates this state. In the following descriptions; a step nnn will be written as [(nnn)], while in flow charts the step will be expressed as [nnn]. Mobile body 220 carrying digital broadcasting receiver terminal 100 is in area 202. If mobile body 220 moves from area 202 of station A201 into area 212 of station B211, it turns out impossible to receive the broadcasting of station A201 (302).

Then, channel scanning is made once again (303), in order to investigate whether or not the broadcasting of station A201 is receivable (304). If station A201 is not receivable despite the channel scanning, then judgment is made as to whether or not station A201 is locating in the area of one's domicile (305). This judgment is made on the basis of, for example, whether or not an area code delivered as station information coincides with an area code of the home area he, or she, registered in digital broadcasting receiver terminal 100. The registration is based on, for example, an information inputted by an audience via input section 106.

The area code here means certain specific numerals allocated to each of the respective regions for identification. The digital broadcasting in Japan uses local codes of ARIB STD-B10, Part 2, Table D-2 in attachment D. However, postal ZIP code, telephone area code, etc, can be used instead.

If station A201 is locating in the area of one's domicile, information about station A201 is kept stored (307); otherwise, the information is judged to be unnecessary and erased (306). In some cases when it turned out impossible to receive station A201, it makes the keep/erase judgment immediately, without making a channel scanning once again.

Station information keep/erase judgment section 103 decides as to whether a station information is to be kept stored or erased. After the keep/erase judgment is conducted on station information, digital broadcasting receiver terminal 100 of mobile body 220 starts receiving the broadcasting of station B211 (401).

When mobile body 220 returned to the neighborhood of one's domicile entering in area 202 of station A and the broadcasting of station B211 became unavailable (402), it selects station A201 whose station information has been kept stored (403); if it is receivable (404), the broadcasting of station A201 can be made available to the audience without making a channel scanning (406). If station A201 is not receivable, a channel scanning is made in search for a receivable station (405).

As described in the above, when a station whose information has been kept stored becomes receivable once again the following advantages are offered in the present embodiment: A station can be selected immediately based on station selection information, without the need of searching the station by scanning relevant receiving band; and Electric program guide (EPG), logo data, etc. can be displayed immediately on the screen by reading service information and program information out of those stored in station information memory 107, without the need of once again acquiring these service information and program information. Furthermore, memory capacity can be reduced and information about a frequently-used station can be stored in the memory, since the information about a station locating in his, or her, home area is put in memory.

Second Exemplary Embodiment

FIG. 1, FIG. 2 and FIG. 4 used in the first embodiment are also used in common for the present second embodiment.

Figure 5:
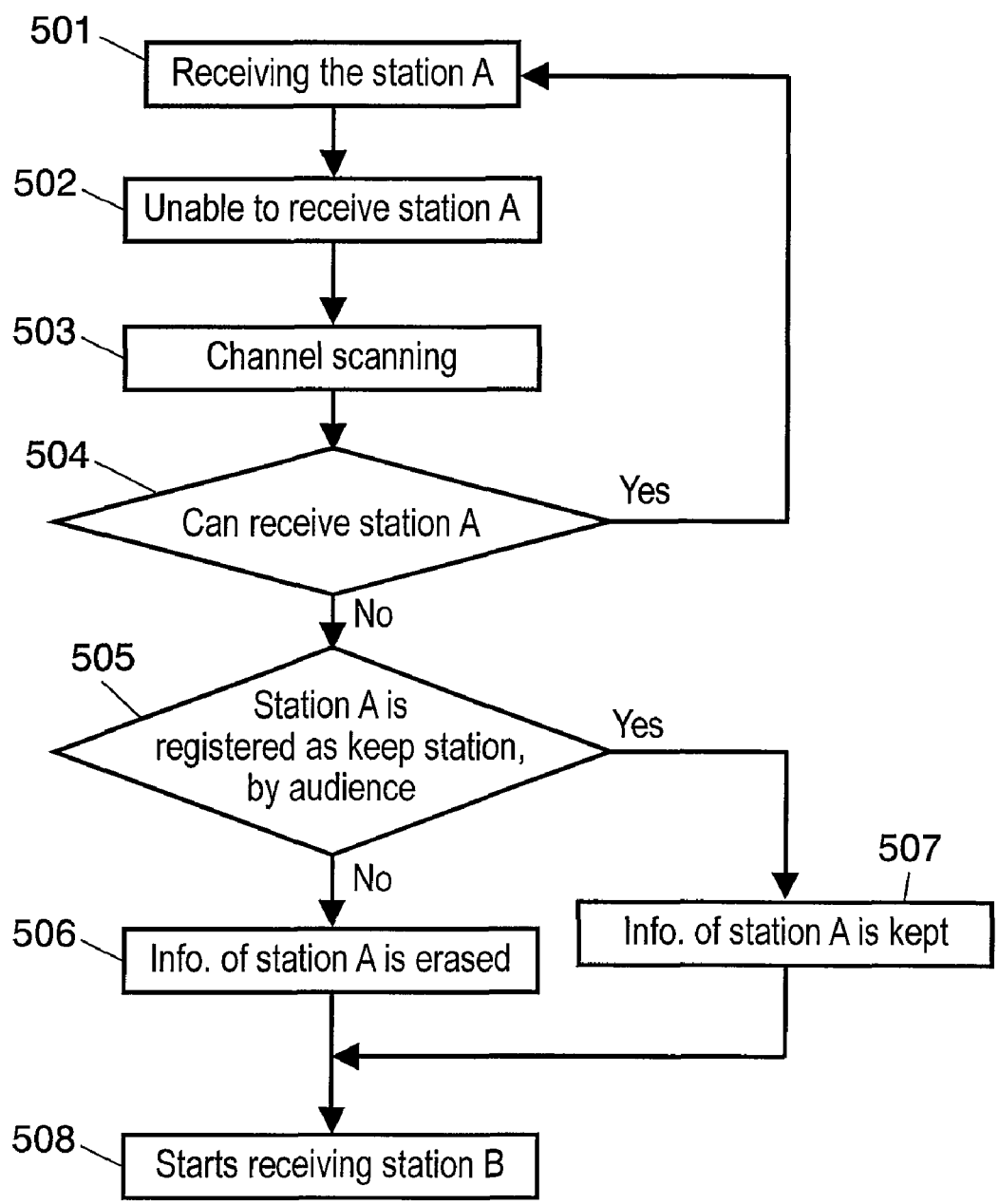
FIG. 5 is a flow chart describing the process how it decides as to whether to keep on storing a station information or erase it, in the second embodiment.

FIG. 5 is a flow chart showing the process how a digital broadcasting receiver terminal in the second embodiment judges as to whether information about a station which turned out to be unavailable for receiving is to be kept stored or erased.

Steps 501, 502, 503, 504, 506, 507 and 508 in FIG. 5 remain the same as steps 301, 302, 303, 304, 306, 307 and 308 of FIG. 3. So, only the point difference from the first embodiment is described here. In a case when station A201 which has been received by an audience turned out to be unavailable, the second embodiment judges as to whether or not station A201 is the station that had been registered by an audience as the one whose station information was not to be erased (505). If station A201 is the one registered as such, station information about station A201 is kept stored (507); otherwise the information is judged to be unnecessary and erased (506). The registration is made beforehand by an audience, for example, via input section 106.

When mobile body 220 returned to area 202 of station A and the broadcasting of station B211 turned out to be unavailable (402), it selects station A201 whose station information has been kept stored (403); if it is receivable, the broadcasting of station A201 is made available to the audience without making a channel scanning (406).

As described in the above, when a station whose information has been kept stored becomes receivable once again the following advantages are offered in the present embodiment: A station can be selected immediately based on station selection information, without the need of searching the station by scanning relevant receiving band; Electric program guide (EPG), logo data, etc. can be displayed immediately on the screen by reading service information and program information out of those stored in station information memory 107, without the need of once again acquiring these service information and program information; Furthermore, since judgment on the keep/erase of station information is made in accordance with the registration made by an audience, information about a station which fits to the audience's wish can be kept stored in memory.

Third Exemplary Embodiment

FIG. 1, FIG. 2 and FIG. 4 used in the first embodiment are also used in common for the present third embodiment.

Figure 6:
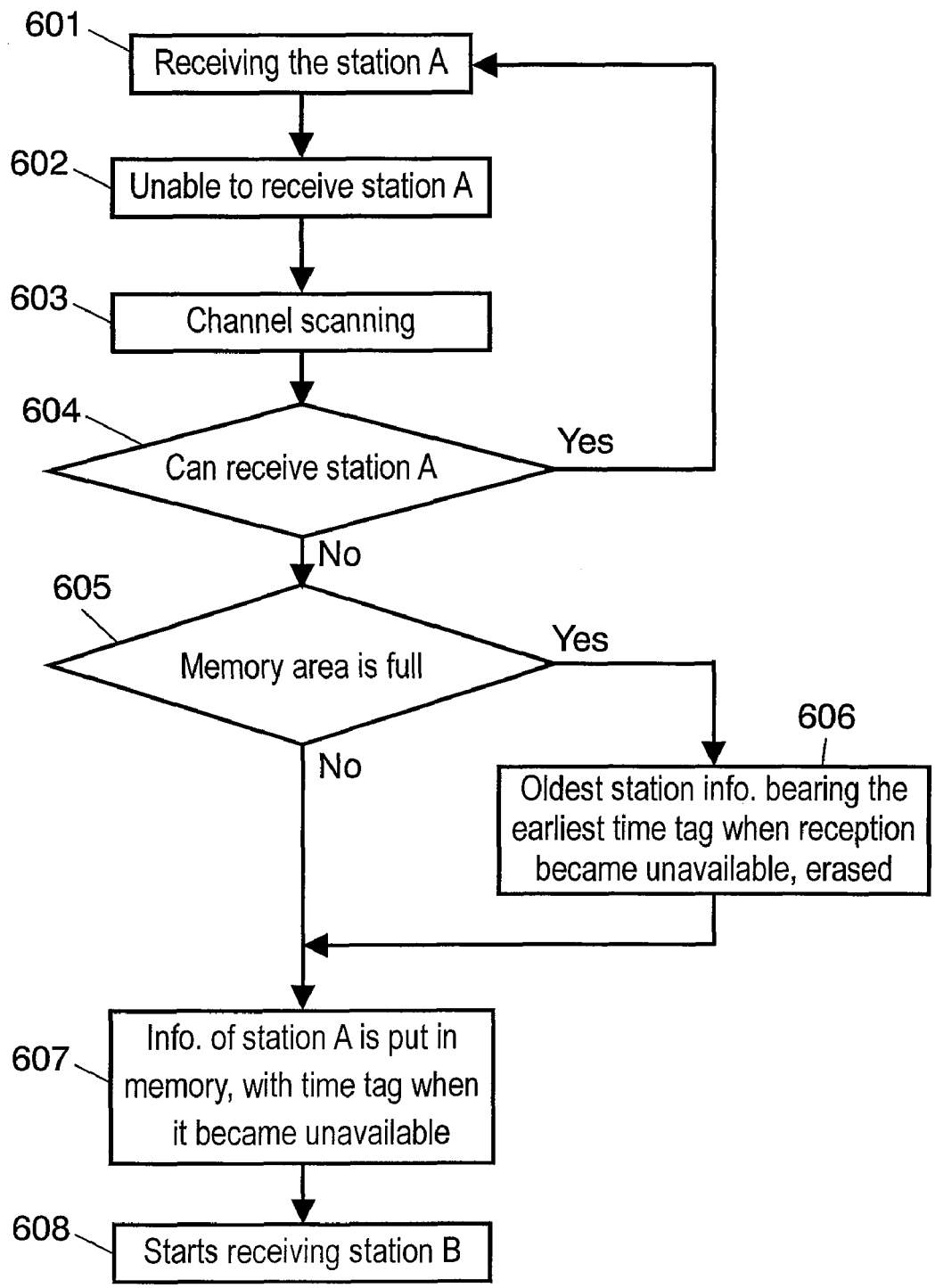
FIG. 6 is a flow chart describing the process how it decides as to whether to keep on storing a station information or to erase it, in the third embodiment.

FIG. 6 is a flow chart which shows the process how a digital broadcasting receiver terminal in the third embodiment judges as to whether information about a station which now turned out to be unavailable for receiving is to be kept stored or erased.

Steps 601, 602, 603, 604 and 608 in FIG. 6 remain the same as those steps 301, 302, 303, 304 and 308 of FIG. 3. So, the following description will be focused on the point of difference from the first embodiment. In a case when station A201 whose broadcasting has been received by an audience turned out to be unavailable for receiving, the third embodiment examines whether or not memory area in station information memory 107 is already fully occupied (605). If not full, information about station A201 is stored in the memory together with an indication of the time when it became unavailable (607). If it is fully occupied already, an information carrying the earliest time indication of reception unavailability is judged to be unnecessary and erased (606), and then information about station A201 including the indication of the time when it turned out to be unavailable are put in the memory (607).

When mobile body 220 returned, after a short period of time, to area 202 of station A and station B211 became unavailable (402), it selects station A201 whose information has been kept stored (403); if it is receivable, the broadcasting of station A201 is made available to the audience without making a channel scanning.

As described in the above, when a station whose information has been kept stored becomes receivable once again the following advantages are offered in the present embodiment: A station can be selected immediately based on station selection information, without the need of searching the station by scanning relevant receiving band; Electric program guide (EPG), logo data, etc. can be displayed immediately on the screen by reading service information and program information out of those stored in station information memory 107, without the need of re-acquiring these service information and program information; Furthermore, since it erases the old information in the order of the earlier time indication when it became unavailable, information about a station of high viewing-frequency can be stored in memory.

Fourth Exemplary Embodiment

FIG. 1, FIG. 2 and FIG. 4 of the first embodiment are used in common also for the present fourth embodiment.

Figure 7:
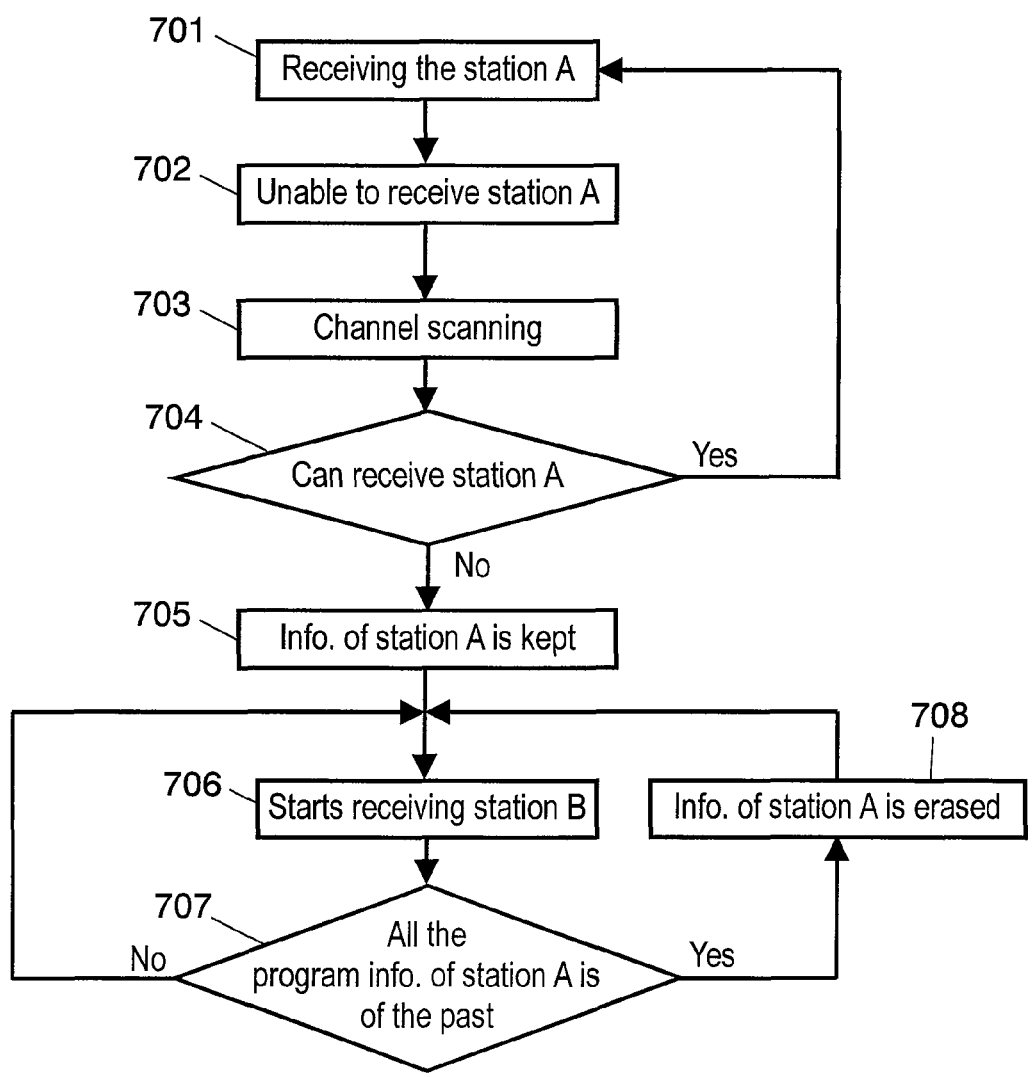
FIG. 7 is a flow chart describing the process how it decides as to whether to keep on storing a station information or erase it, in the fourth embodiment.

FIG. 7 is a flow chart which shows the process how a digital broadcasting receiver terminal in the fourth embodiment judges as to whether information about a station which turned out to be unavailable for receiving is to be kept stored in memory or erased.

Steps 701, 702, 703 and 704 in FIG. 7 remain the same as those steps 301, 302, 303 and 304 of FIG. 3. So, the following description will be focused to the point of difference from the first embodiment. In the present fourth embodiment, information about station A201 is kept stored even after station A201 became unavailable for receiving (705). After shifting to receive station B211 (706), judgment is made as to whether all the program information, among those information about station A201 stored, is of the past factor or not (707). If the program information still bears a future factor, information is kept stored as it is; whereas if all the program information is of the past nature, information about station A201 is judged to be unnecessary and erased (708).

In a case when mobile body 220 soon returned to area 202 of station A201 and station B211 became unavailable (402), it selects station A201 whose information has been kept stored (403); if it is receivable, the broadcasting of station A201 is made available to the audience without making a channel scanning.

As described in the above, when a station whose information has been kept stored becomes receivable once again the following advantages are offered in the present fourth embodiment: A station can be selected immediately based on station selection information, without the need of searching the station by scanning relevant receiving band; Electric program guide (EPG), logo data, etc. can be displayed immediately on the screen by reading service information and program information out of those stored in station information memory 107, without the need of re-acquiring these service information and program information; Furthermore, since it makes the keep/erase judgment based on whether or not there is a program information having future factor, program information of a station bearing a high viewing-frequency can be utilized effectively.

Fifth Exemplary Embodiment

FIG. 2 and FIG. 4 of the first embodiment are used in common also for the present fifth embodiment.

Figure 8:
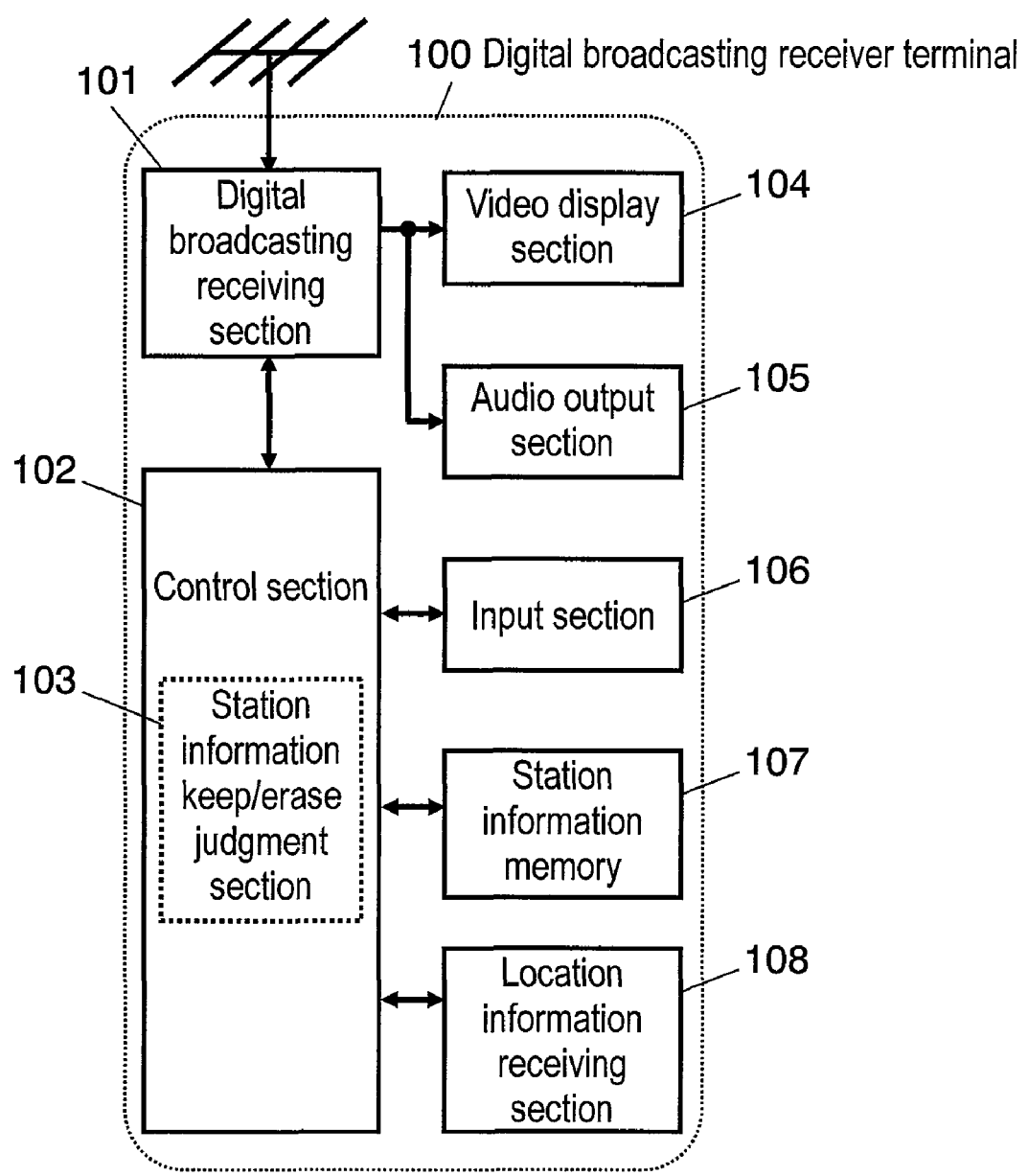
FIG. 8 is a block diagram showing the structure of digital broadcasting receiver terminals in the fifth and sixth embodiments.

FIG. 8 is a block diagram which shows a digital broadcasting receiver terminal in the fifth embodiment of the present invention. In FIG. 8, digital broadcasting receiver terminal 100 includes digital broadcasting receiving section 101, control section 102, station information keep/erase judgment section 103, video display section 104, audio output section 105, input section 106, station information memory 107, and location information receiving section 108. With the exception of location information receiving section 108, digital broadcasting receiver terminal 100 remains the same as that shown in FIG. 1. Location information receiving section 108 receives information about the place at which digital broadcasting receiver terminal 100 presently locates. It can be formed with a GPS information receiver, for example.

Figure 9:
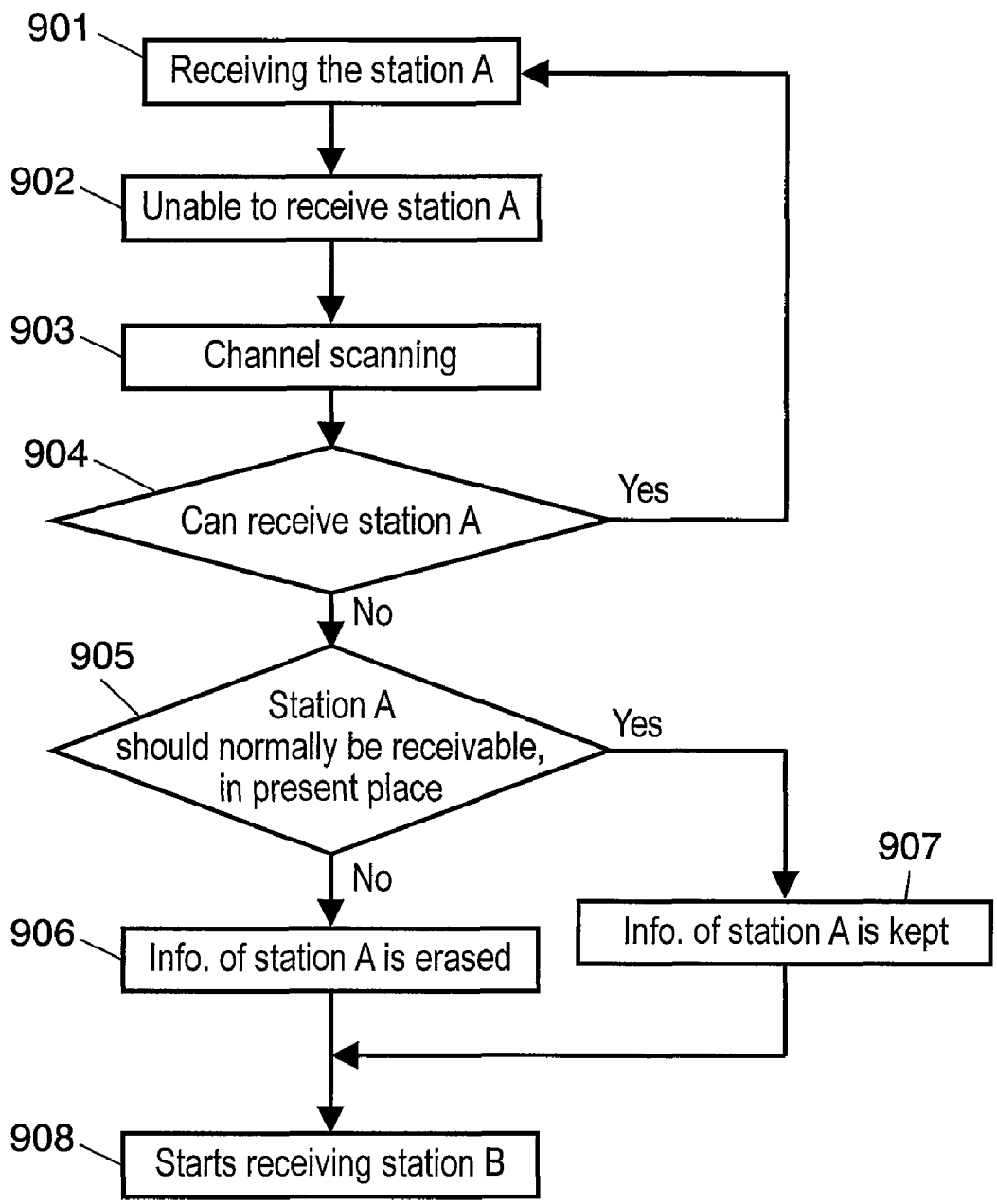
FIG. 9 is a flow chart describing the process how it decides as to whether to keep on storing a station information or erase it, in the fifth embodiment.

FIG. 9 is a flow chart which shows the process how a digital broadcasting receiver terminal in the fifth embodiment judges as to whether information about a station which turned out unavailable for receiving is to be kept stored or erased.

Steps 901, 902, 903, 904, 906, 907 and 908 in FIG. 9 remain the same as steps 301, 302, 303, 304, 306, 307 and 308 of FIG. 3. So, the following description will be focused to the point of difference from the first embodiment. In a case when it turned out impossible to receive the broadcasting of station A201, the fifth embodiment examines if the present location is a place where station A201 should normally be receivable (905).

The judgment is made by examining, for instance, whether an area code delivered as station information coincides with an area code calculated based on the present location received at location information receiving section 108 of digital broadcasting receiver terminal 100. The present location received at location information receiving section 108 means, for example, the geographical latitude and longitude received at a built-in, or external, GPS information receiving section, information on location of base station received at a portable telephone section, etc. For obtaining an area code from the present place, a conversion table may be used which converts the geographical latitude and longitude, information about the place of base station as received by a portable telephone, etc., for example, into an area code. Such a table is stored in a memory of digital broadcasting receiver terminal 100.

Instead of employing location information receiving section 108, there can be a case where an area code of a station other than the presently-receiving station A201 is used for the present location.

If the present location is judged to be an area where the broadcasting of station A201 should normally be receivable, information about station A201 is kept stored (907); otherwise, information about station A201 is erased (906). And then, digital broadcasting receiver terminal 100 starts receiving the broadcasting of station B211.

When mobile body 220 again entered in area 202 of station A201 without making further cruising to other region and the broadcasting of station B211 became unavailable (402), it selects station A201 whose information has been preserved (403); if it is receivable, the broadcasting of station A201 is made available to the audience without making a channel scanning.

As described in the above, when a station whose information has been kept stored becomes receivable once again the following advantages are offered in the present embodiment: A station can be selected immediately based on station selection information, without the need of searching the station by scanning relevant receiving band; Electric program guide (EPG), logo data, etc. can be displayed immediately on the screen by reading service information and program information out of those stored in station information memory 107, without the need of re-acquiring these service information and program information; Furthermore, since the keep/erase judgment is made based on whether or not a place is in an area where the station should normally be receivable, a station information can be kept stored even if the reception is interrupted for a short time because of a tunnel, shadowing by large buildings, etc.

Sixth Exemplary Embodiment

FIG. 2, FIG. 4 and FIG. 8 of the fifth embodiment are used in common also for the present sixth embodiment.

Figure 10:
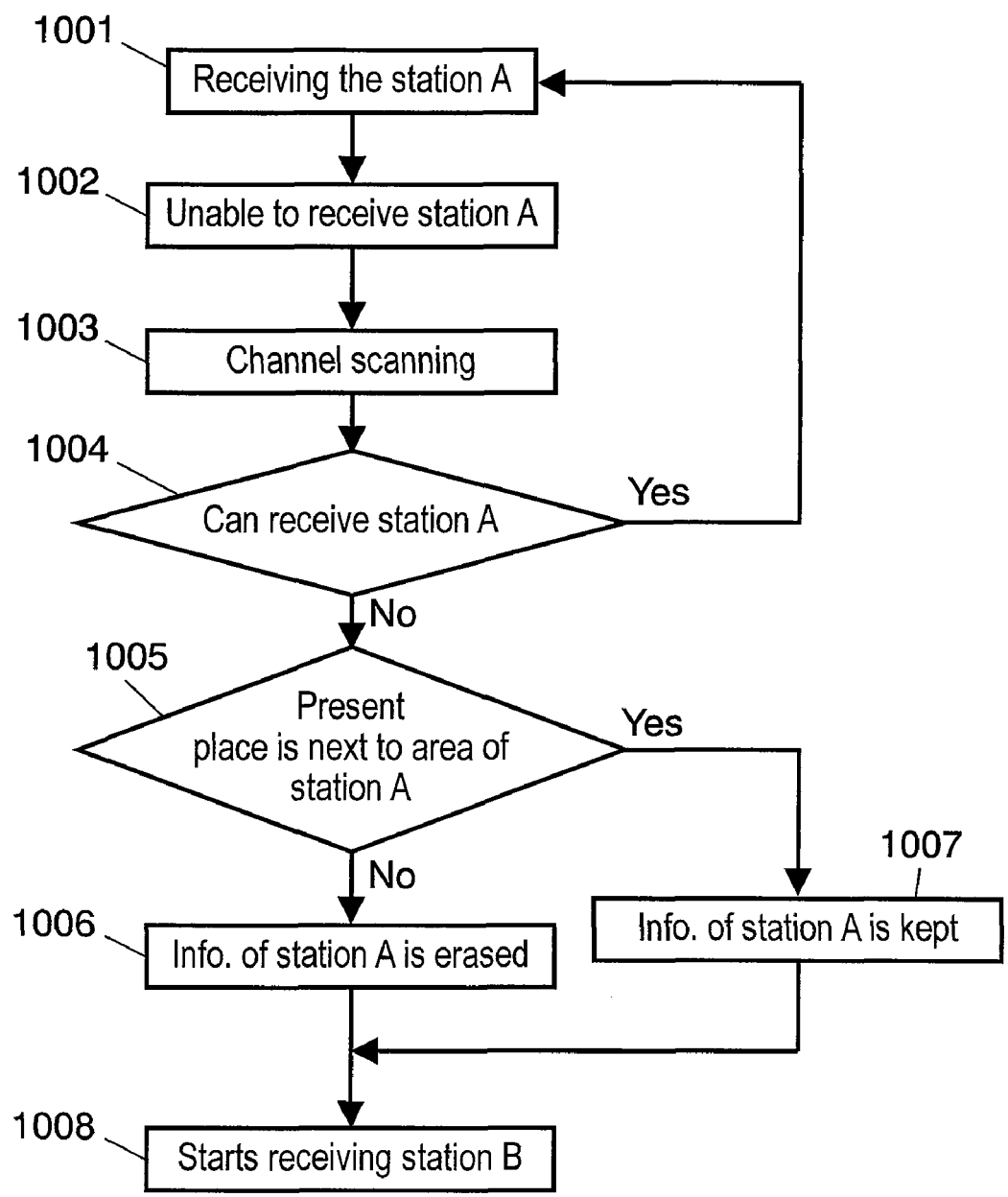
FIG. 10 is a flow chart describing the process how it decides as to whether to keep on storing a station information or erase it, in the sixth embodiment.

FIG. 10 is a flow chart which shows the process how a digital broadcasting receiver terminal in the sixth embodiment judges as to whether information about a station which turned out to be unavailable for receiving is to be kept stored or erased.

Steps 1001, 1002, 1003, 1004, 1006, 1007 and 1008 in FIG. 10 remain the same as those steps 901, 902, 903, 904, 906, 907 and 908 of FIG. 9. So, the following description will be focused to the point of difference from the fifth embodiment. When the broadcasting of station A201 becomes unavailable for reception, the sixth embodiment judges if the present location is a place that is contiguous to an area where station A201 is receivable (1005).

The judgment is made using, for example, an area code delivered as station information and an area code calculated based on the present location received at location information receiving section 108 of digital broadcasting receiver terminal 100. In order to judge whether a certain region is contiguous to an area or not by using area code, a table may be employed which table exhibiting area codes of contiguous areas for each of respective area codes. Such a table is stored in a memory of digital broadcasting receiver terminal 100.

If the present location is judged to be a region that is contiguous to an area where station A201 should normally be receivable, information about station A201 is kept stored (1007); otherwise, information about station A201 is erased (1006). And then, digital broadcasting receiver terminal 100 receives the broadcasting of station B211.

When mobile body 220 entered from the contiguous region into area 202 of station A201 again and the broadcasting of station B211 turned out to be unavailable (402), it selects station A201 whose information has been stored (403); if it is receivable, the broadcasting of station A201 is made available to the audience without making a channel scanning.

As described in the above, when a station whose information has been kept stored becomes receivable once again the following advantages are offered in the present embodiment: A station can be selected immediately based on station selection information, without the need of searching the station by scanning relevant receiving band; Electric program guide (EPG), logo data, etc. can be displayed immediately on the screen by reading service information and program information out of those stored in station information memory 107, without the need of re-acquiring these service information and program information; Furthermore, since the keep/erase judgment is made based on whether or not the region is contiguous to an area where the station should normally be receivable, the information is kept stored for a station bearing a high probability of soon resuming the transmitting/receiving relationship.

Seventh Exemplary Embodiment

FIG. 2 and FIG. 4 of the first embodiment are used in common also for the present seventh embodiment.

Figure 11:
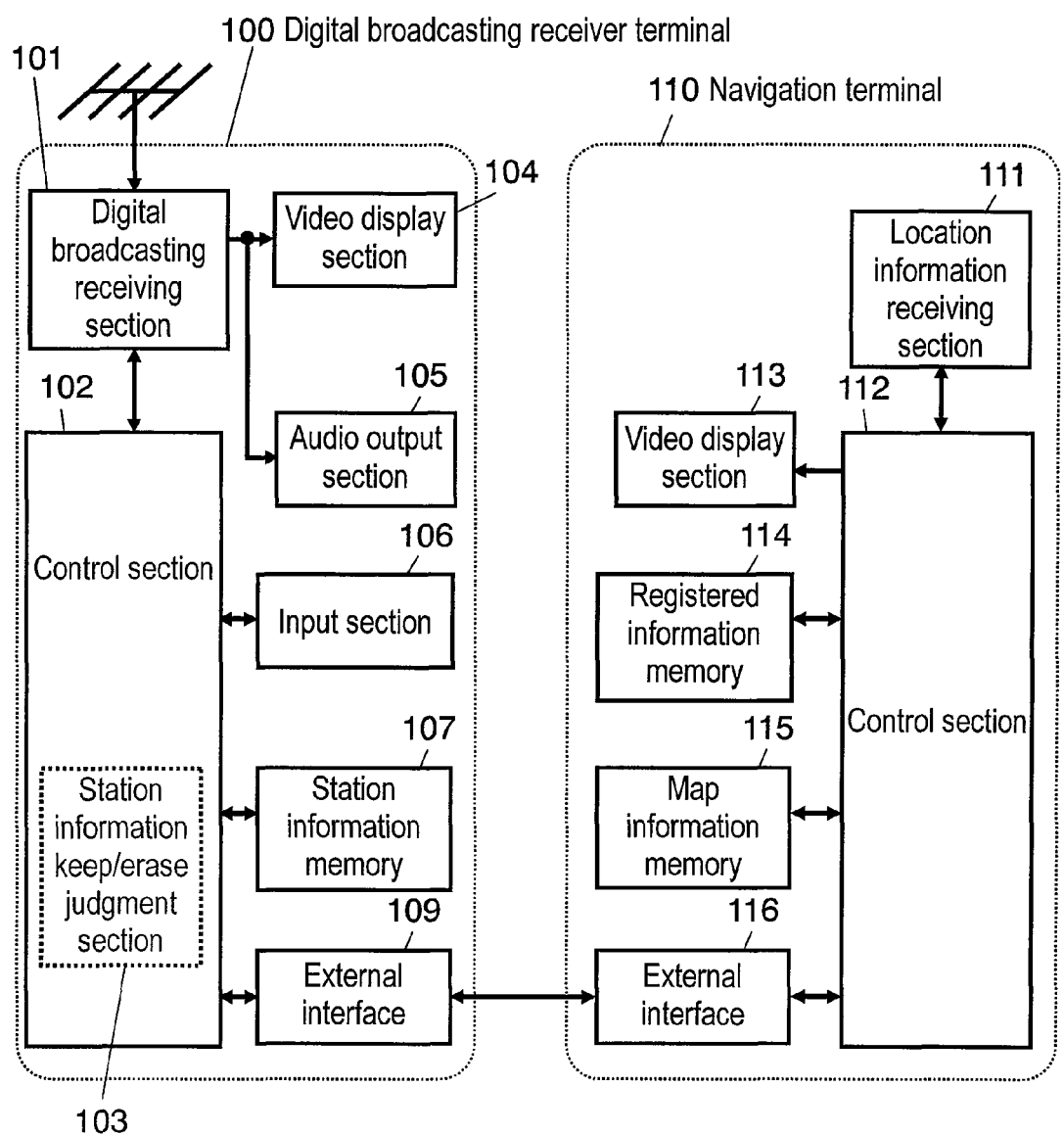
FIG. 11 is a block diagram showing the structure of digital broadcasting receiver terminals in the seventh and eighth embodiments.

FIG. 11 is a block diagram which shows a digital broadcasting receiver terminal and a navigation terminal in accordance with the seventh embodiment of the present invention. In FIG. 11, digital broadcasting receiver terminal 100 includes digital broadcasting receiving section 101, control section 102, station information keep/erase judgment section 103, video display section 104, audio output section 105, input section 106, station information memory 107, and external interface section 109. Navigation terminal 110 includes location information receiving section 111, control section 112, video display section 113, registered information memory 114, map information memory 115, and external interface section 116. Location information receiving section 111 can be formed with, for example, a GPS information receiver.

Digital broadcasting receiver terminal 100 remains the same as that shown in FIG. 1, with the exception of external interface section 109. External interface section 109 is connected with external interface section 116 of navigation terminal 110. Location information receiving section 111, which is under the control of control section 112, receives information about the present location and offers the information to control section 112. Registered information memory 114 stores information of various contents designated by an audience. Map information memory 115 stores information about map, and offers, according to the control of control section 112, a requested map information to control section 112. Video display section 113 displays, under the control of control section 112, a requested map and other information.

Figure 12:
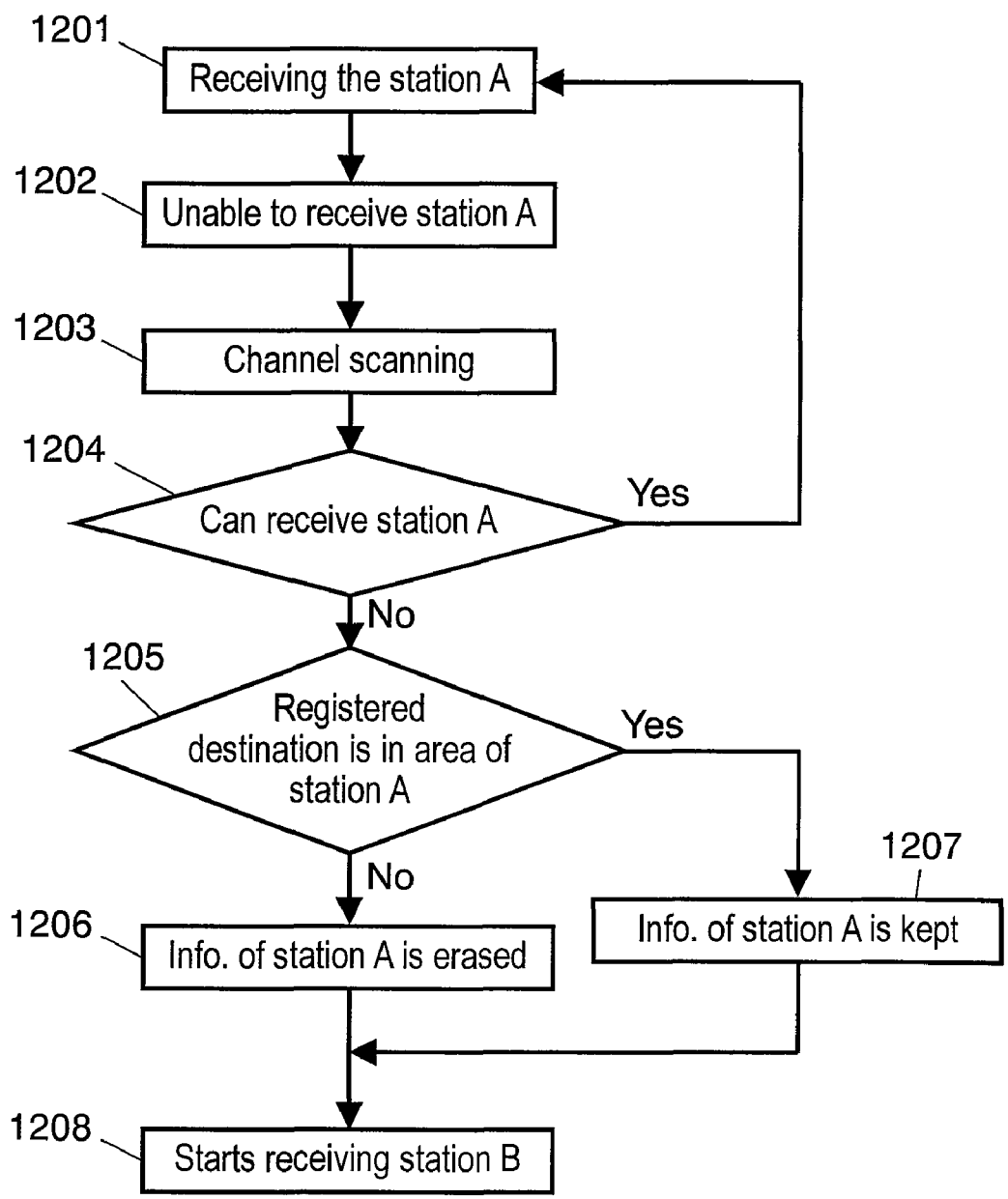
FIG. 12 is a flow chart describing the process how it decides as to whether to keep on storing a station information or erase it, in the seventh embodiment.

FIG. 12 is a flow chart which shows the process how digital broadcasting receiver terminal 100 in the seventh embodiment judges as to whether information about a station which is now unavailable for receiving is to be kept stored or erased.

Steps 1201, 1202, 1203, 1204, 1206, 1207 and 1208 in FIG. 12 remain the same as those steps 301, 302, 303, 304, 306, 307 and 308 of FIG. 3. So, the following description will be focused to the point of difference from the first embodiment. When it turns out to be impossible to receive the broadcasting of station A201, the seventh embodiment judges whether destination place registered in registered information memory 114 of navigation terminal 110 is in an area where station A201 should normally be receivable, or not (1205).

The judgment is made by examining, for example, whether an area code delivered as station information coincides with an area code which is calculated based on location information of the destination place registered in navigation terminal 110. The location information of destination place is stored in a memory of navigation terminal in the form of, for example, the geographical latitude and longitude.

If it is judged that the registered destination place is in the area where station A201 should normally be receivable, information about station A201 is kept stored (1207); otherwise, information about station A201 is erased (1206).

When mobile body 220 entered again in area 202 of station A201 on the way to the registered destination and it turned out impossible to receive station B211 (402), it selects station A201 whose information has been kept stored (403); if it is receivable, the broadcasting of station A201 is made available to the audience without making a channel scanning.

As described in the above, when a station whose information has been kept stored becomes receivable once again the following advantages are offered in the present embodiment: A station can be selected immediately based on station selection information, without the need of searching the station by scanning relevant receiving band; Electric program guide (EPG), logo data, etc. can be displayed immediately on the screen by reading service information and program information out of those stored in station information memory 107, without the need of once again acquiring these service information and program information; Furthermore, since the keep/erase judgment is made based on whether registered destination place is in an area of station, information about a station of high visiting frequency can be kept stored with high priority.

Eighth Exemplary Embodiment

FIG. 2, FIG. 4 and FIG. 11 of the seventh embodiment are used in common also for the present eighth embodiment.

Figure 13:
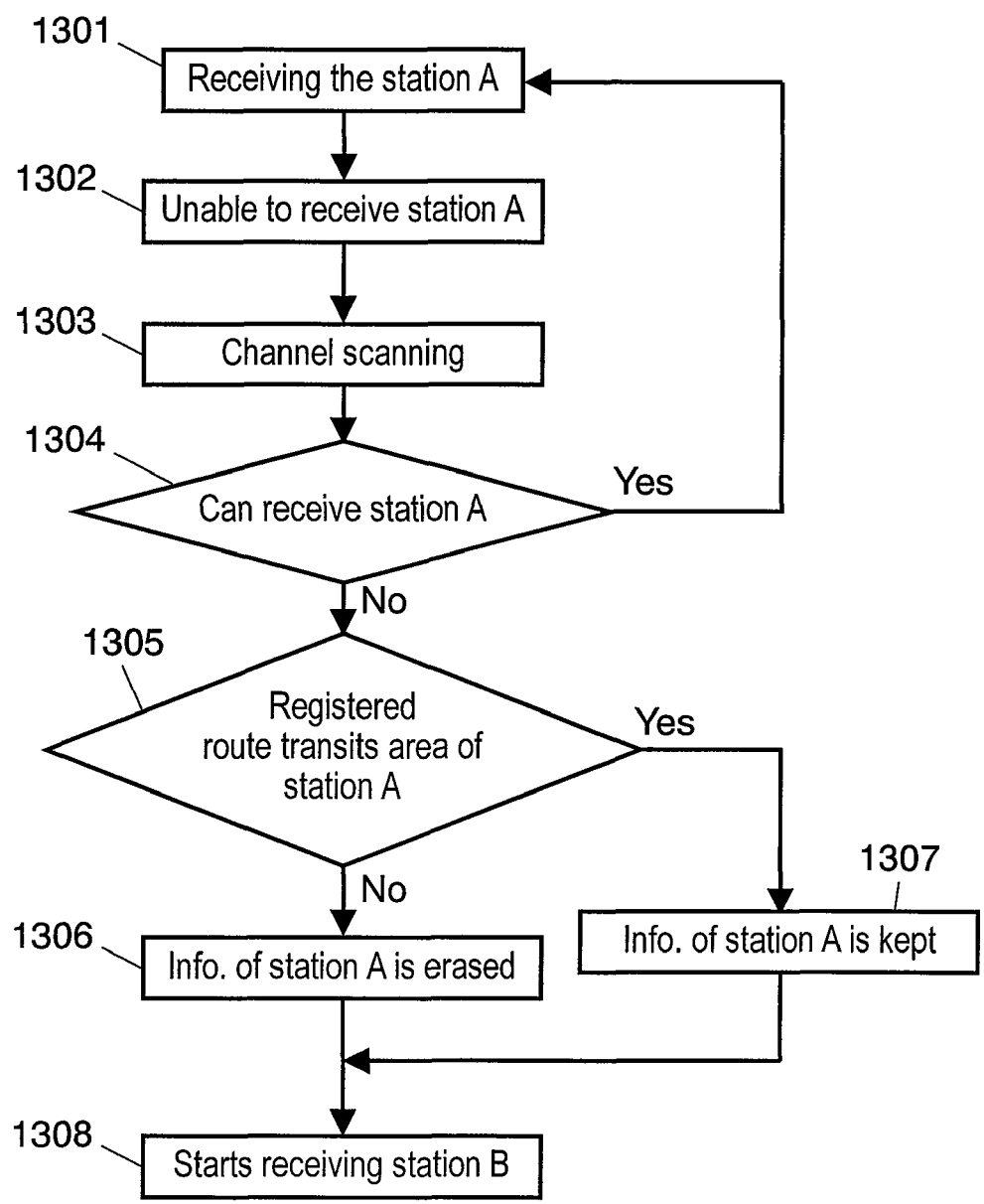
FIG. 13 is a flow chart describing the process how it decides as to whether to keep on storing a station information or erase it, in the eighth embodiment.
Figure 14:
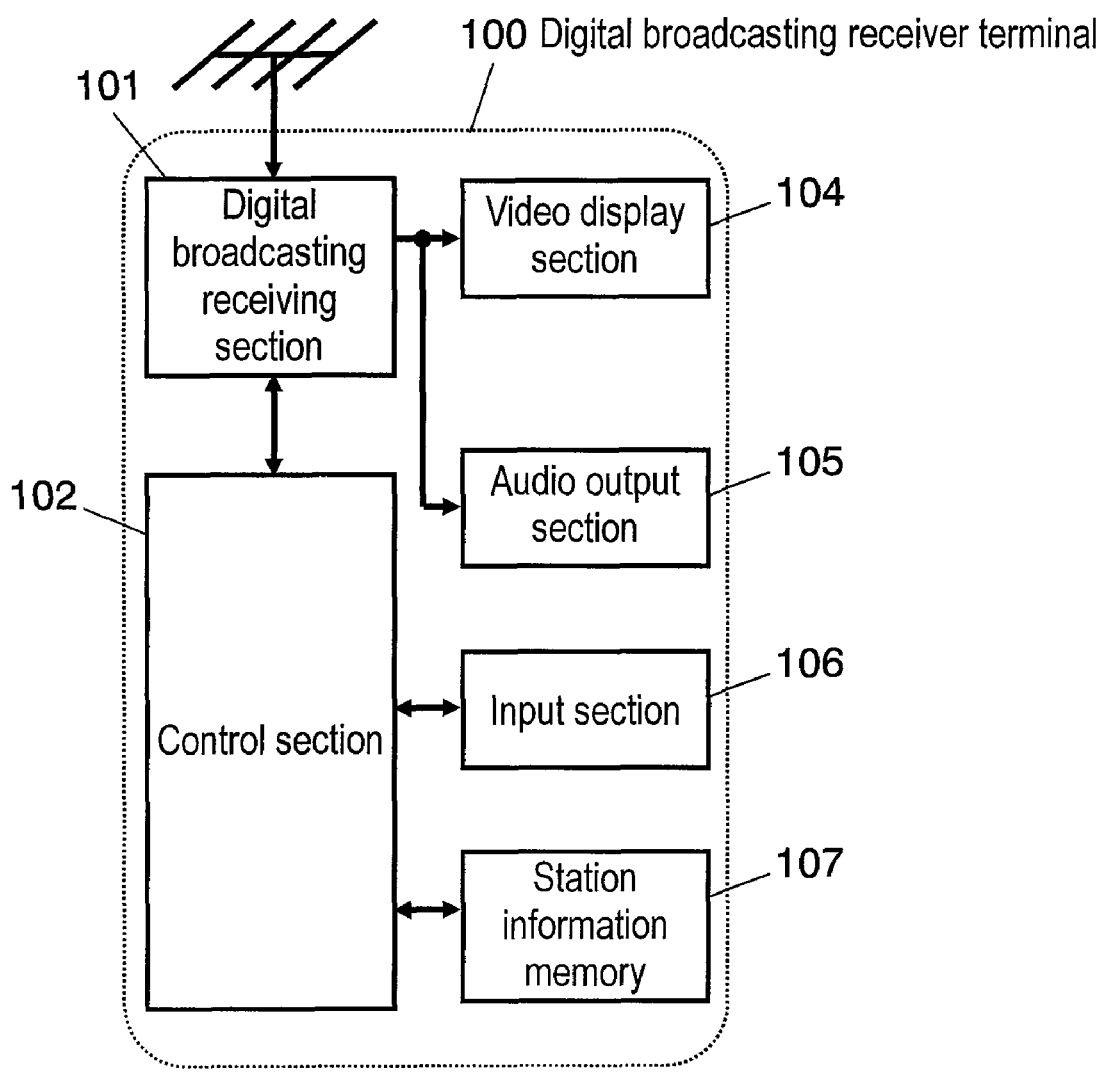
FIG. 14 is a block diagram showing the structure of a conventional digital broadcasting receiver terminal.
Figure 15:
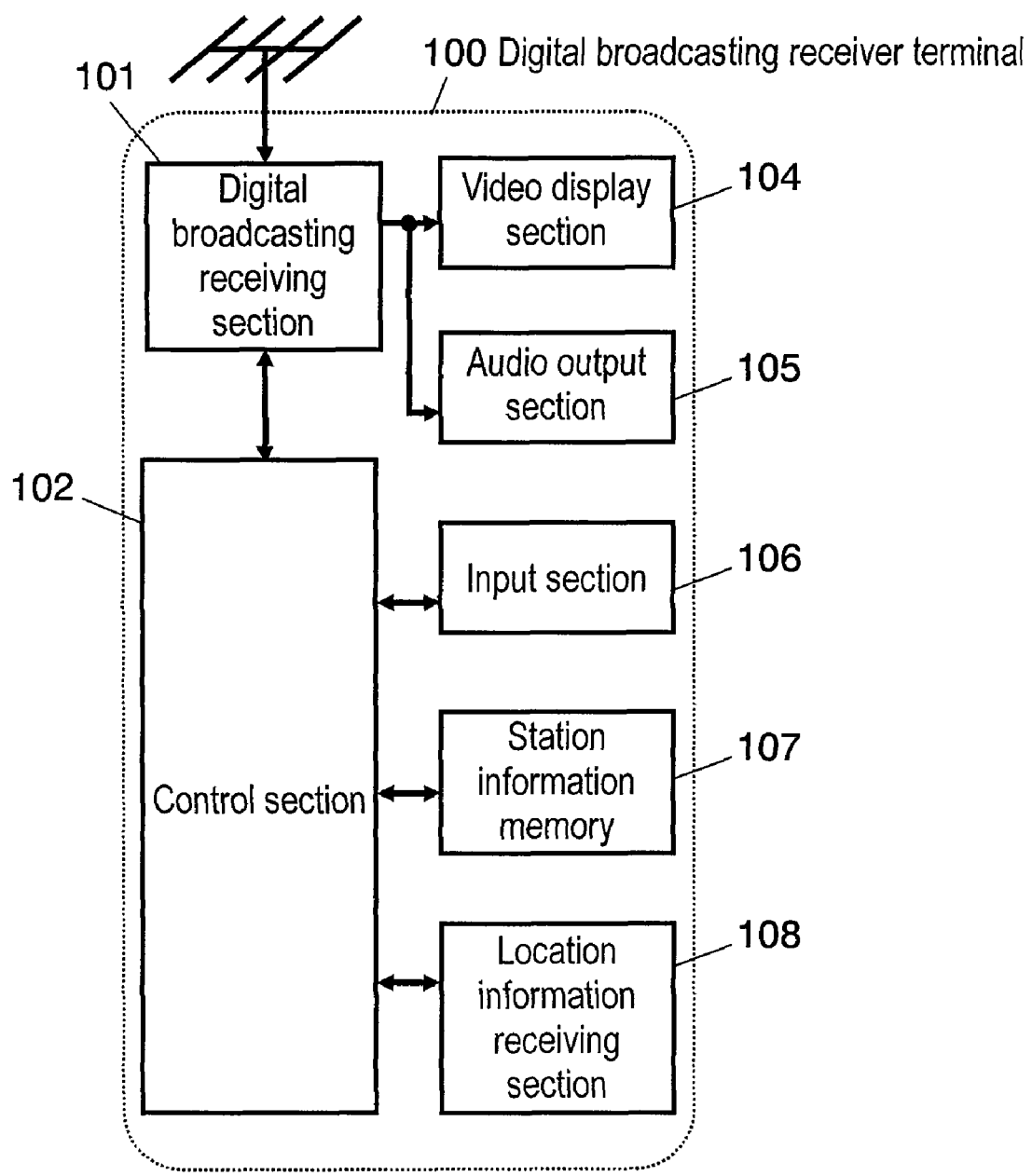
FIG. 15 is a block diagram showing the structure of a conventional digital broadcasting receiver terminal.

FIG. 13 is a flow chart which shows the process how digital broadcasting receiver terminal 100 in the eighth embodiment judges as to whether information about a station which became unavailable for receiving is to be kept stored or erased.

Steps 1301, 1302, 1303, 1304, 1306, 1307 and 1308 in FIG. 13 remain the same as those steps 1201, 1202, 1203, 1204, 1206, 1207 and 1208 of FIG. 12. So, the following description will be focused to the point of difference from the seventh embodiment. When reception of the broadcasting of station A201 turned out to be unavailable, the eighth embodiment judges whether or not a route registered in registered information memory 114 of navigation terminal 110 transits an area where station A210 should normally be receivable (1305). The route information is stored in a memory of navigation terminal 110 in the form of, for example, the geographical latitude and longitude of the starting place, destination place and key transit points.

The judgment is made by examining whether an area code delivered as station information coincides with area codes calculated from location information of the key transit points of the route registered in navigation terminal 110.

If it is judged that the registered route transits an area where station A201 should normally be receivable, information about station A201 is kept stored (1307); otherwise, information about station A201 is erased (1306).

During the cruise along the route, when mobile body 220 entered again in area 202 of station A201 and it turned out impossible to receive station B211 (402), it selects station A201 whose information has been kept stored (403); if it is receivable, the broadcasting of station A201 is made available to the audience without making a channel scanning.

As described in the above, when a station whose information has been kept stored becomes receivable once again the following advantages are offered in the present embodiment: A station can be selected immediately based on station selection information, without the need of searching the station by scanning relevant receiving band; Electric program guide (EPG), logo data, etc. can be displayed immediately on the screen by reading service information and program information out of those stored in station information memory 107, without the need of re-acquiring these service information and program information; Furthermore, since the keep/erase judgment is made based on whether or not a registered route transits an area of a station, information about a station which is locating in an area of high transit frequency is kept stored with high priority.

INDUSTRIAL APPLICABILITY

When a station whose information has been kept stored turned out to be receivable again, a digital broadcasting receiver terminal in the present invention can immediately select the station based on station selection information, without making a channel scanning in search for the station. And it can be put into service immediately without the need of re-acquiring program information. Thus, the advantages would be appreciated by those who are involved in the sector of receiving digital broadcasting on a mobile body.

The invention claimed is:

1. A digital broadcasting receiver terminal comprising:
    a digital broadcasting receiving section for receiving digital broadcasting for one or more stations;
    a station information memory for storing station selection information for a corresponding station restored at the digital broadcasting receiving section;
    a station information keep/erase judgment section for determining whether to keep or erase the station selection information stored in the station information memory for a currently selected station, when the currently selected station becomes unavailable for receiving, based on criteria exclusive of signal reception, the criteria including a location of the respective station relative to a predetermined location; and
    a control section for selecting among the one or more stations based on station selection information stored in the station information memory;
    wherein the station information keep/erase judgment section decides to store the information together with an indication of a time when broadcasting turned out to be unavailable, as new information, if a memory area of the station information memory for storing the station selection information is not full;
    if the memory area is full, the keep/erase judgment section determines that old information bearing an earliest indication of the time when it turned out to be unavailable for receiving is not necessary anymore, erases the old information, and then stores the new information.

2. The digital broadcasting receiver terminal claim 1, wherein the station information keep/erase judgment section determines whether to keep or erase the station selection information stored in the station information memory, depending on whether or not the station is locating in the same area as an audience's domicile.

3. The digital broadcasting receiver terminal of claim 2, wherein the station information keep/erase judgment section judges whether or not the station which turned out to be unavailable for receiving is locating in the same area as the audience's domicile, using an area code transmitted from the station and an area code of the audience's domicile.

4. The digital broadcasting receiver terminal of claim 2, wherein the station selection information includes at least one of a physical channel, an ID which identifies a certain specific station and an area code.

5. The digital broadcasting receiver terminal of claim 1, wherein the station selection information includes at least one among a physical channel, an ID which identifies a certain specific station and an area code.

6. The digital broadcasting receiver terminal of claim 1 further comprising an input section for registering an audience's instruction designating a certain station whose information is not to be erased,
wherein the station information keep/erase judgment section determines whether to keep or erase the station selection information stored in the station information memory, based on whether or not the station is designated by an audience as being one whose information is not to be erased.

7. The digital broadcasting receiver terminal of claim 1 further comprising a location information receiving section for receiving location information,
wherein the station information keep/erase judgment section determines whether to keep or erase the station selection information, based on whether or not a present location delivered from the location information receiving section is in an area where the station is normally receivable.

8. The digital broadcasting receiver terminal of claim 7, wherein the location information receiving section is a GPS information receiving section.

9. The digital broadcasting receiver terminal of claim 7, wherein the present location is defined in relation to a geographical latitude and longitude.

10. The digital broadcasting receiver terminal of claim 7, wherein
the location information receiving section is a portable telephone section.

11. The digital broadcasting receiver terminal of claim 10, wherein the present location is information with respect to a place of a portable telephone base station.

12. The digital broadcasting receiver terminal of claim 1 further comprising a location information receiving section for receiving location information,
wherein the station information keep/erase judgment section determines whether to keep or erase the station selection information, based on whether or not a present location is contiguous to an area where the station is receivable.

13. The digital broadcasting receiver terminal of claim 12, wherein the location information receiving section is a GPS information receiving section.

14. The digital broadcasting receiver terminal of claim 12, wherein the present location is defined in relation to a geographical latitude and longitude.

15. The digital broadcasting receiver terminal of claim 12, wherein
the location information receiving section is a portable telephone section.

16. A digital broadcasting receiver terminal comprising:
a digital broadcasting receiving section for receiving digital broadcasting for one or more stations;
a station information memory for storing station selection information for a corresponding station restored at the digital broadcasting receiving section;
a station information keep/erase judgment section for determining whether to keep or erase the station selection information stored in the station information memory for a currently selected station, when the currently selected station becomes unavailable for receiving, based on criteria exclusive of signal reception, the criteria including a location of the respective station relative to a predetermined location;
a control section for selecting among the one or more stations based on station selection information stored in the station information memory; and
an external interface which is controlled by the control section and connected with a navigation terminal,
wherein the station information keep/erase judgment section determines whether to keep or erase the station selection information stored in the station information memory, based on whether or not a destination place registered in the navigation terminal's registered information memory is in an area where the station is normally receivable.

17. The digital broadcasting receiver terminal of claim 16, wherein the station information keep/erase judgment section determines whether or not the destination place is registered in the area where the station, whose broadcasting turned out to unavailable, is normally receivable, based on an area code transmitted from the station and an area code of a region in which the destination place is contained.

18. A digital broadcasting receiver terminal comprising:
a digital broadcasting receiving section for receiving digital broadcasting for one or more stations;
a station information memory for storing station selection information for a corresponding station restored at the digital broadcasting receiving section;
a station information keep/erase judgment section for determining whether to keep or erase the station selection information stored in the station information memory for a currently selected station, when the currently selected station becomes unavailable for receiving, based on criteria exclusive of signal reception, the criteria including a location of the respective station relative to a predetermined location;
a control section for selecting among the one or more stations based on station selection information stored in the station information memory; and
an external interface which is controlled by the control section and connected with a navigation terminal,
wherein the station information keep/erase judgment section determines whether to keep or erase the station selection information stored in the station information memory, based on whether or not a route registered in the navigation terminal's registered information memory is transiting an area where the station is normally receivable.

19. The digital broadcasting receiver terminal of claim 18, wherein the station information keep/erase judgment section determines whether or not the registered route transits the area of the station, whose broadcasting turned out to be unavailable, which is normally receivable, using an area code transmitted from the station and an area code of a region which contains a key transit point of the route.

* * * * *